United States Patent
Nepper, Sr.

(12) 
(10) Patent No.: US 6,343,827 B1
(45) Date of Patent: Feb. 5, 2002

(54) BRIDGELIKE CONNECTOR (AXIALLY EXTENDING BETWEEN APERTURED LEADWARD RIGID-SHEET AND TRAILWARD FIXTURE-BAR(S) )

(76) Inventor: John P. Nepper, Sr., 9826 Hartman Ave., Omaha, NE (US) 68134

( * ) Notice: Subject to any disclaimer, the term of this patent is extended or adjusted under 35 U.S.C. 154(b) by 0 days.

(21) Appl. No.: 09/589,540

(22) Filed: Jun. 8, 2000

(51) Int. Cl.$^7$ ................................................. B62J 17/04
(52) U.S. Cl. ...................................... 296/78.1; 403/223
(58) Field of Search ......................... 296/78.1; 403/223, 403/225, 226, 243

(56) References Cited

U.S. PATENT DOCUMENTS

| | | | | |
|---|---|---|---|---|
| 2,558,589 A | * | 6/1951 | Skolfield | 403/225 X |
| 2,974,984 A | * | 3/1961 | Koch | 403/225 |
| 3,801,152 A | * | 4/1974 | Tims et al. | 296/78.1 |

FOREIGN PATENT DOCUMENTS

| | | | | |
|---|---|---|---|---|
| GB | 701934 | * | 1/1954 | 296/78.1 |

* cited by examiner

Primary Examiner—Dennis H. Pedder
(74) Attorney, Agent, or Firm—George R. Nimmer

(57) ABSTRACT

The subject BRIDGELIKE CONNECTOR extends axially bridge-wise between an apertured leadward rigid-sheet (perhaps as a motorcycle windshield) and one or more trailward fixture-bars (perhaps leadwardly emanating from a motorcycle handlebar). The BRIDGELIKE CONNECTOR is wholly provided of a resiliently-compressible resinous structural material and which in axial extent structurally and methodwise primarily includes a lengthwise-predominate tubular trailward-length adapted to be readily trailwardly insertable through a dimensionally similar rigid-sheet aperture, and trailmostably is adapted to securely frictionally surround a fixture-bar, the tubular- bore thereof leadwardly terminating within a trail-part of an also axially extending lengthwise-secondary leadward-length; and leadwardly axially serially for the leadward-length, the tubular trail-part being thusly resiliently compressibly deformable to permit trailward insertion through the rigid-sheet aperture and then in a relieved non-compressed state abuts the rigid-sheet trail-face, a cross-sectionally constricted medial-part thusly located within a dimensionally similar rigid-sheet aperture, and a lead-part ultimately arriving in abutment against the rigid-sheet lead-face.

5 Claims, 6 Drawing Sheets

BRIDGELIKE CONNECTOR (AXIALLY EXTENDING BETWEEN APERTURED LEADWARD RIGID-SHEET AND TRAILWARD FIXTURE-BAR(S))

BACKGROUND OF THE INVENTION

Attached drawing FIG. 1 (Prior Art), in cross-sectional view, schematically illustrates a traditional problem confronting workers in the prior art quest of reliably and economically providing an axially-multi-directional bridgelike connection (CPA) extending along a horizontal-axis "HA" between:

a leadwardly positioned upright rigid-sheet "RS" (and which might, inter alia, take the form of a motorcycle uprightly extending windshield) and having at least one aperture "A" extending along horizontal-axis "HA" and which aperture "A" has a finite length "FL" and has thereabout a preferably circular symmetrical cross-sectional area "AC"; and a trailwardly positioned fixture-bar "FB" (and which might, inter alia, take-the form of a leadwardly extending bracket of a motorcycle trailward handlebar portion that in one or embodiments might extend along a one or more such horizontal-axes "HA").

Most prior art workers have attempted to solve the above mentioned traditional problem by interposing mainly-mechanical axially multi-directional types bridgelike connectors (CPA) between a such rigid-sheet aperture ("A") and a such trailwardly positioned fixture-bar "FB". However, such mainly-mechanical types bridgelike connections offered by prior art workers are fraught with the following disadvantages and deficiencies:

they are only semi-conveniently adaptable for usage between an apertured ("A") upright rigid-sheet ("RS") and a trailward fixture-bar "FB", and even considering such semi-inconvenience, such prior art devices are unduly expensive, oftentimes functionally unreliable, and prone to vexatious maintenance problems.

GENERAL OBJECTIVES OF THE INVENTION

In view of the aforementioned disadvantages and deficiencies attendant with efforts exerted by prior art workers: it is the general objective of the present invention to provide improved axially multi-directional, economical, and yet remarkably functionally reliable, bridgelike connector (e.g. as the FIG. 2 embodiment 10 therefor) over the prior art quest "CPA", and thusly adaptably securely extendable ("HA")between at least one apertured "A" upright rigid-sheet ("RS") and at least one trailwardly positioned fixture-bar ("FB") and including aptly appropriate novel adaptions therefor.

GENERAL STATEMENT OF THE INVENTION

With the above general objectives in view, and together with other ancillary and related objectives, which will become more apparent as this description proceeds, the bridgelike connector concept of the present invention (horizontally axially extending "HA" between an apertured "A" rigid upright-sheet "RS" and at least one trailward fixture-bar "FB" generally comprises, as alluded to in the FIG. 2 representative embodiment 10, namely: in securely engaged horizontal bridgewise environmental combination between: an aperture horizontally through a leadwardly positioned upright rigid-sheet having opposed lead-face and trail-face and which aperture at a finite cross-sectional value symmetrically surrounds a said horizontal-axis and therealong a remotely trailwardly positioned fixture-bar, and a bridgelike connector constructed throughout of a resiliently compressible elastic resinous structural material and comprising therealong "HA":

(A) a lengthwise predominate tubular trail-length located wholly rearwardly of the rigid-sheet trail-face, and having its tubular-bore extending leadwardly into the realm of a secondary leadward-length for said bridgelike connector; and (B) a lengthwise-secondary leadward-length including in horizontally extending series therealong, leadwardly to trailwardly, as follows:

(Bi) a lead-part abuttably confronting the rigid-sheet leadface and in surrounding relationship to h the rigidsheet aperture;

(Bii) a cross-sectionally constricted medial-part located within the horizontal finite length "FL" of the upright rigid-sheet aperture "A"; and (Biii) a trail -part abuttably confronting the; rigid-sheet lead-face and in surrounding relationship to the rigid-sheet aperture.

Method steps for accomplishing a said sought bridgelike connection is schematically indicated in drawing FIG. 3 wherein a such FIG. 2 representative embodiment 10 is initially positioned leadwardly of an environmental rigid-sheet "RS" along a such horizontal-axis "HA" and then (as indicated in FIG. 3 double-headed arrow) is moved directionally trailwardly along horizontal-axis "HA" through (and resultantly securely engaged with) the rigid-sheet aperture portion "A", and thence ultimately in securely surrounded frictional engagement with a such fixture-bar "FB", said methodology, including the following method steps:

(i) relatively effortously passing the bridgelike connector trailward-length through the rigid-sheet aperture "A" and thence semi-securely elastically surroundably engaging the somewhat cross-sectionally larger fixture-bar "FB";

(ii) manually resiliently compressing the leadward-length trail-part through the rigid-sheet aperture so as to enable its directionally trailward passage through the rigid-sheet aperture(s), and immediately thereafter in a relieved non-compressed state automatically abuts the upright rigid-sheet trail-face in surrounding relationship to its aperture and such trailward-length and leadward trail-part relieved non-compressed state together providing highly-augmented surroundable engagement about a such fixture-bar "FB"; and (iii) the aforedescribed method steps (i) and (ii) coincidentally result in:

the leadward-length medial-part (18) to become surroundably and lengthwise securely seated within the rigid-sheet aperture "A", and the leadward-length lead-part (17) to automatically abut the rigid-sheet lead-face "LF", in surrounding relationship to the said aperture "A".

BRIEF DESCRIPTION OF THE DRAWING

In the drawing, wherein like characters refer to like parts in the several views, and in which.

DETAILED DESCRIPTION OF THE DRAWING

Figure 2:
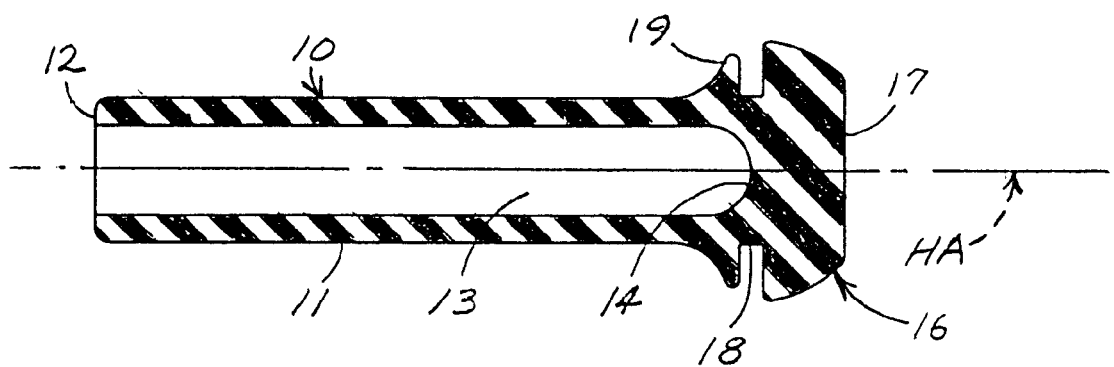
FIG. 2 is a sectional elevational view of a representative embodiment 10 of an improved bridgelike connector functionable as the bridgewise connection "CPA" mentioned in connection with FIG. 1.

Turning initially to the aforedescribed drawing FIG. 2 e which typically cross-sectionally depicts, along a horizontal-axis "HA", a representative embodiment 10 of the novel bridgelike connector concept of the present invention. Throughout the horizontal length "HA" thereof (i.e. between a trailward-length (11) trail-end 12 and leadwardly axially therefrom terminating at a leadward-length (16) lead-part 17) representative embodiment 10 symmetrically (and preferably throughout circularly) surrounds said horizontal-axis "HA". Bridgelike connector embodiments 10 of the present invention are continuously molded throughout of thermoplastic rubber or other functionally similar stretchy resiliently-compressive elastomeric resinous structural material.

And in further reference to drawing FIG. 2, the said bridge-like connector representative embodiment 10 comprises along horizontal-axis "HA" γ a lengthwise-predominate trailward-length 11 that cross-sectionally dimensionally approximates (and preferably marginally smaller) than that "AC" of an upright rigid-sheet ("RS") aperture "A";

a lengthwise-secondary leadward-length 16.

In further reference to the disclosure made in the immediately preceeding paragraph: the representative embodiment trail-length is horizontally tubular (13) throughout. Such tubular bore (13) commences at the trailward-length (11) trail-end 12 and extends leadwardly therefrom to leadwardly terminate as a bore leadward-terminus (14) located leadwardly of trailward-length 11 within the realm of a trail-part 19 for such leadward-length 16. Moreover, such leadward-length 16, serially axially ("HA") includes: a said trailpart 19 and a lead-part 17 that respectively cross-sectionally dimensionally exceed that ("AC") for the upright rigid-sheet aperture ("A"); and a cross-sectionally constricted medial-part 18 that substantially cross-sectionally matches that of of the upright rigid-sheet aperture size ("AC") and having a medial-part axial length substantially equal to that ("FL")for the rigid-sheet aperture "A".

Figure 3:
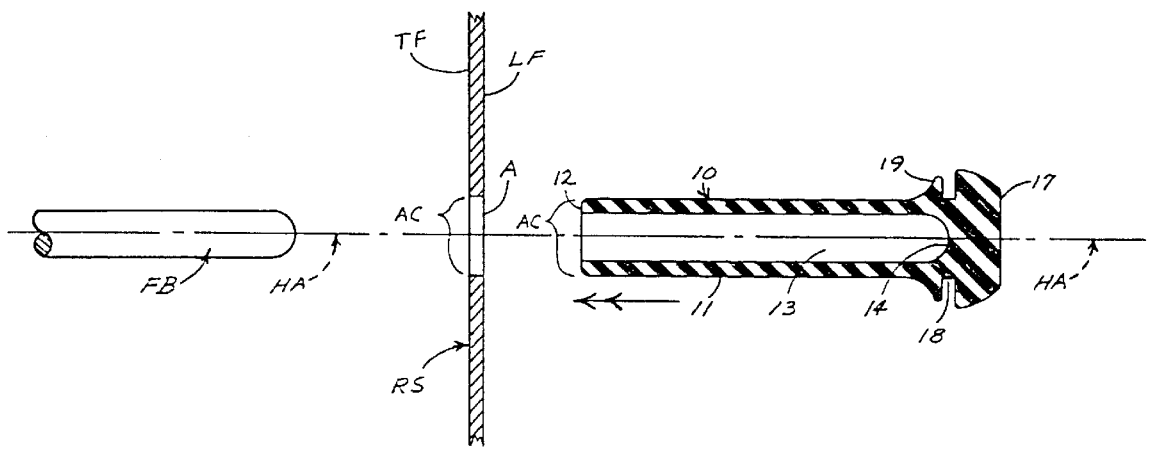
FIG. 3, aforementioned, which schematically combines the parts of drawing FIGS. 1 and 3, alludes at its double-headed arrow→→ for effecting a securely engaged bridge-like connection between a such apertured "A" rigid-sheet "RS" and the fixture-bar "FB" of FIG. 1.
Figure 4:
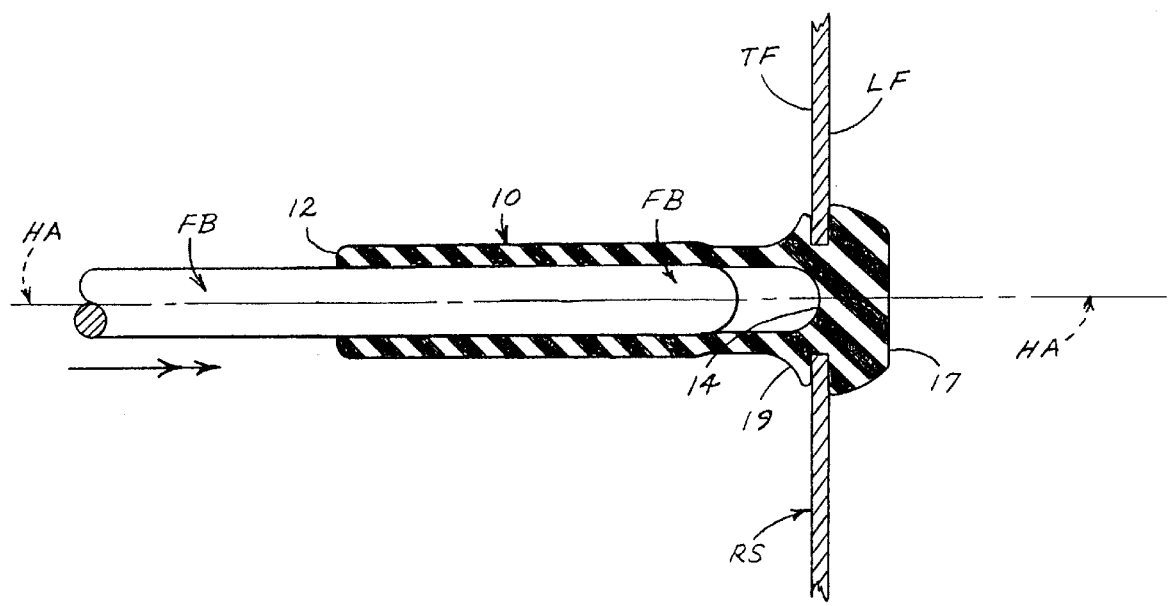
FIG. 4 alludes to the actually attained bridgelike connection (e.g. 10 alluded to in drawing FIGS. 1–3.

Accordingly, utilizing stepwise methodology suggested in drawing FIG. 3 (wherein a representative bridgelike connector (10) is initially positioned axially leadwardly of an upright rigid-sheet aperture ("A") and thence moved→axially directionally trailwardly toward the upright rigid-sheet aperture ("A")), the following method steps (i), (ii), and (iii) result in the FIG. 4 secure combination between a leadwardly positioned upright rigid-sheet ("RS") at an aperture "A" and respective leadwardly extending and trailwardly positioned fixture-bar "FB";

(i) relatively effortously passing the bridgelike connector trailward-length through the rigid-sheet aperture "A" and thence semi-securely surroundably engaging the somewhat cross-sectionally larger fixture-bar "FB";

(ii) manually resiliently compressing the leadward-length (16) trail-part 19 so to enable its directionally trailward passage through aperture "A" and immediately thereafter in a relieved non-compressed state automatically abuts the rigid-sheet "RS" trail-face "TF" in surrounding relationship to such aperture "A". Coincidentally, such trail-part (19) relieved non-compressed state provides a highly-augmented surroundably engagement about a such fixture-bar ("FB"); and (iii) the aforedescribed method steps (i) and (ii) coincidentally result in: the leadward-length medial-part 18 to become surrondably and lengthwise securely seated within the rigid-sheet aperture "A", and the leadward-length lead-part 17 to automatically abut the rigid-sheet upright lead-lead-face "LF".

Figure 1:
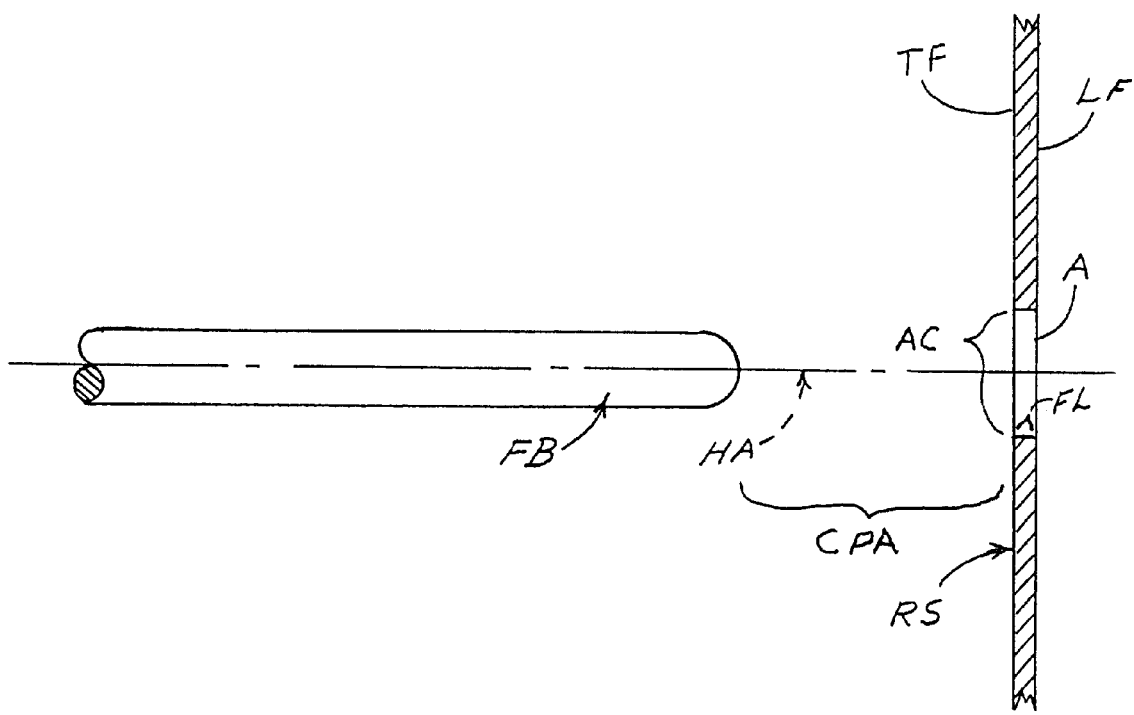
FIG. 1 (Prior Art) aforedescribed is a sectional elevational view depicting a such traditional problem directed toward an economical, reliable, and relatively maintenance-free bridgelike connection "CPA" between a leadwardly positioned, one or more apertured "A", upright rigid-sheet "RS" and a trailwardly positioned, one or more, fixture-bar "FB"
Figure 5:
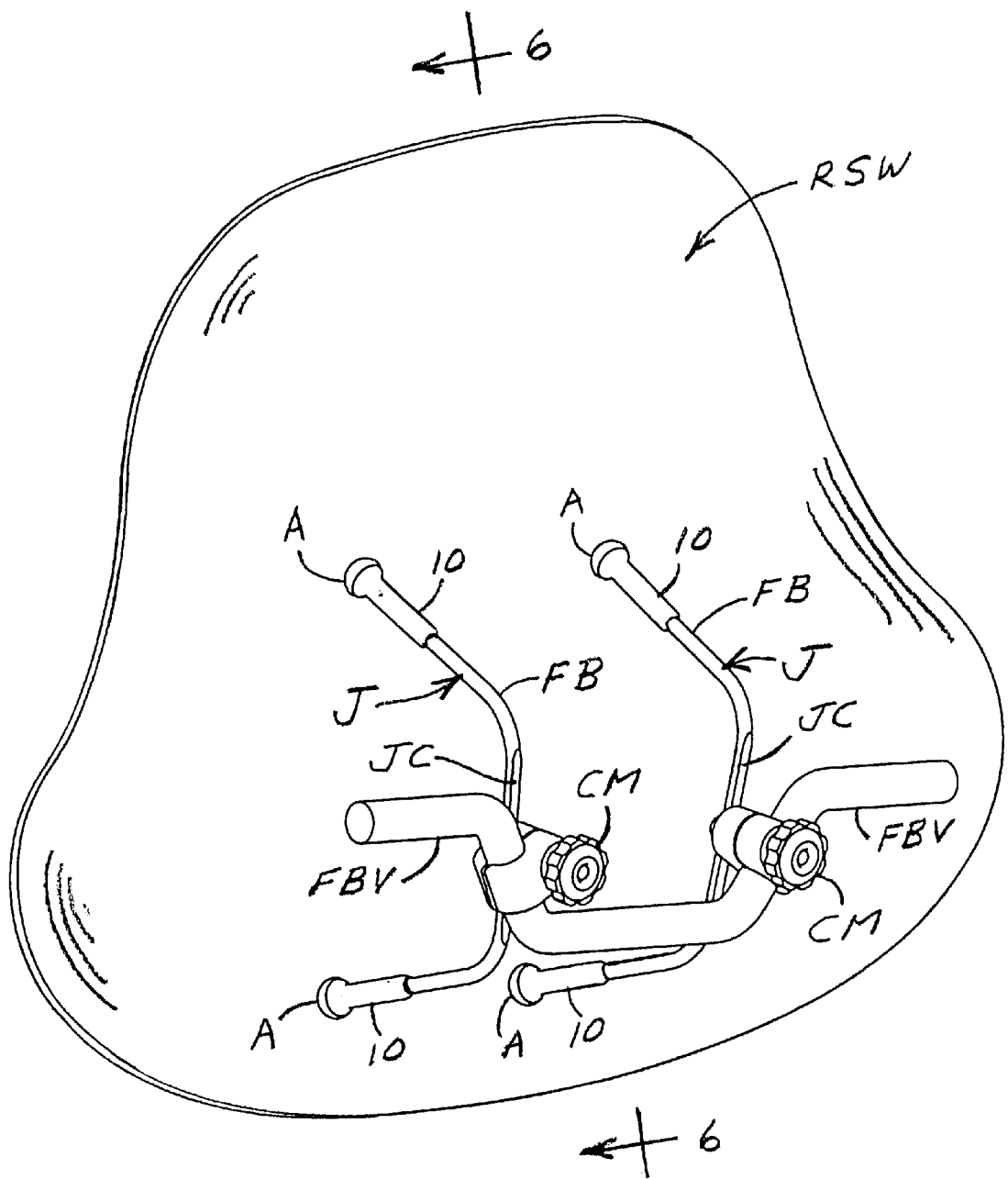
FIG. 5 represents a trailwardly perceived perspective view of the FIG. 3 and FIG. 4 depicted general combination but wherein: the environmental rigid-sheet as "RSW" depicts a motor vehicle upright windshield having two pairs of vertically separated apertures "A" and which pairs are directionally horizontally transversely separated; and the environmental fixture-bar as twice-recited "FBV" takes the form of a directionally horizontally transversely extending motorcycle (or similar) handlebar that includes clamping means "CM" therefor.
Figure 7:
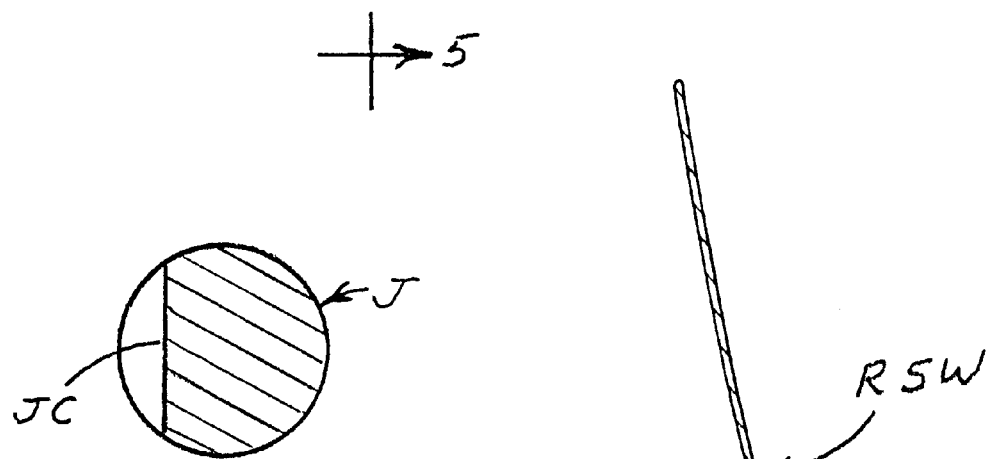
FIG. 7 is a sectional view taken along lines 7—7 of FIGS. 5 and 6.
Figure 6:
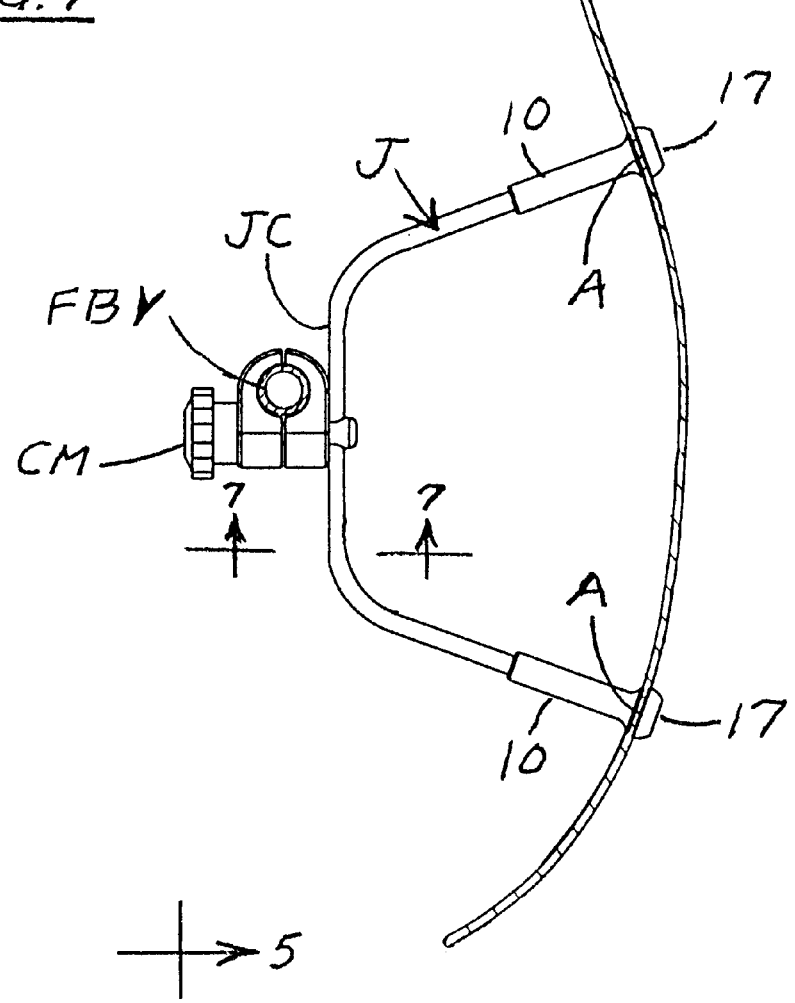
FIG. 6 is a leadwardly facing elevational view taken along line 6—6 of FIG. 5.

Drawing FIGS. 5 and 6 refer to one of possible alternate conditions (analagous to that of FIG. 1) wherein: the upright rigid-sheet takes the form of a motorcycle windshield "RSW" having directionally transversely separated pairs of vertically separated apertures "A" and securely effected (e.g. 10) with dually-pronged "FB") upright c-shaped joinders "J" to a directionally horizontally extending motorcycle handle-bar. Such trailwardly positioned and leadwardly extending (from joinders "J" fixture-bars "FB") are, as suggested in FIG. 7, trailwardly truncated "JC", toward securely effecting an especially secure/clamping engagement at the fixture-bars combination upright portion "J", emanating from the vehicle handle bars portion.

From the foregoing, the Bridgelike Connector (extending axially between apertured leadward upright rigid-sheet and trailward fixture-bar(s)) will be readily understood and further explanation is believed to be unnecessary. However, since numerous modifications and equivalents referred to above will readily occur to those skilled in the art, it is not desired to limit the invention to the exact drawings and text referred to above, except as to the claims herewith appended.

What is claimed is:

1. In securely engaged horizontal bridgewise environmental combination between: an apertured portion through a leadwardly positioned upright rigid-sheet and a remotely trailwardly positioned fixture-bar: a bridge-like connector constructed throughout of a resiliently compressible elastic resinous material and comprising symmetrically about a horizontal-axis therefor and said bridgelike connector comprising:

(A) a trail-part having a cross-sectional area approximating that of the rigid-sheet apertured portion and located wholly trailwardly of said upright-sheet and having its tubular bore commencing at a trail-end for said trailward-length and extending lengthily leadwardly to terminate as a lead-terminus located lengthwise leadwardly beyond said trail-length and into a trail-part of a lengthwise-secondary leadward-length for said bridgelike connector; and (B) said lengthwise-secondary leadward-length including in horizontally extending consecutive series:
  (Bi) a lead-part abuttably confronting the rigid-sheet and in surrounding relationship to the rigid-sheet apertured portion;
  (Bii) a cross-sectionally constricted medial-part located within the horizontal length of the rigid-sheet apertured portion; and
  (Biii) said trail-part abuttably confronting another side of the rigid-sheet and in surrounding relationship to the rigid-sheet apertured portion.

2. The bridgelike connector combination of claim 1 wherein the said rigid-sheet apertured portion has a finite short-length along and concentrically surrounds said horizontal-axis and wherein said leadward-length medial-part circularly concentrically surrounds said horizontal-axis and has a medial-part-length substantially equivalent to said apertured portion and defining a horizontal separation between said leadward-length lead-part and trail-part; and wherein the leadward-length lead-part and trail-part respectively concentrically surround the rigid-sheet apertured portion.

3. In the combination of claim 1, a said leadwardly extending fixture-bar securely surroundably frictionally engaged by the bridgelike connector tubular trailward-length.

4. In further combination with the claim 3 combination wherein the rigid-sheet in the form of a vehicular windshield includes a pair of said vertically separated apertured portions; and wherein there is a pair of vertically separated fixture-bars respectively having an intervening uprightly extending joinder to provide a generally C-shaped bracket for said frictionally engaged fixture-bars, said joinders being of generally circular cross-sectional-shape and that are trailwardly truncated with a vertically-planar portion.

5. In further combination with the said claim 4 combination comprising a motor vehicle provided with a directionally horizontally transversely extending handlebar equipped therealong with a pair of clamp means; a duality of said vertically separated rigid-sheet apertured portions and wherein there is a pair of directionally horizontally extending bracket upright joinders respectively securely located within said handlebar clamp means.

\* \* \* \* \*